United States Patent [19]

Robertson

[11] 4,145,032

[45] Mar. 20, 1979

[54] LIVESTOCK GATE

[76] Inventor: Larry L. Robertson, R.R. 1, La Prairie, Ill. 62346

[21] Appl. No.: 781,178

[22] Filed: Mar. 25, 1977

[51] Int. Cl.² ............................................. E04H 17/00
[52] U.S. Cl. ........................................ 256/73; 256/24; 98/121 R
[58] Field of Search ...................... 256/24, 21, 22, 23, 256/25, 73, 19; 52/473, 626, 663; 98/121 R

[56] References Cited

U.S. PATENT DOCUMENTS

| | | | |
|---|---|---|---|
| 1,118,365 | 11/1914 | Loehler | 98/121 R |
| 1,673,906 | 6/1928 | Fager | 98/121 R |
| 2,083,681 | 6/1937 | Baldwin | 156/15 |
| 2,618,821 | 11/1952 | Corn | 52/76 |
| 2,789,792 | 4/1957 | Davis | 98/121 R |
| 2,825,537 | 3/1958 | Wolfe et al. | 256/22 |
| 3,034,610 | 5/1962 | Lynch | 256/25 X |
| 3,303,622 | 2/1967 | Minds, Jr. | 52/473 |
| 3,393,896 | 7/1968 | Poland | 256/24 X |
| 3,960,367 | 6/1976 | Rogers | 256/21 |

FOREIGN PATENT DOCUMENTS

| | | | |
|---|---|---|---|
| 196898 | 7/1938 | Switzerland | 52/473 |
| 2826 of | 1908 | United Kingdom | 98/121 R |

*Primary Examiner*—Andrew V. Kundrat
*Attorney, Agent, or Firm*—Cook, Wetzel & Egan, Ltd.

[57] ABSTRACT

A gate is described for use in constructing an enclosure for livestock. The gate includes a plurality of vertically extending and horizontally spaced bars supported between upper and lower, horizontally extending support members. Each bar has a center portion and a pair of edge portions inclined from the center portion to define a vertically extending channel between the edge portions. The bars are disposed between the upper and lower support members such that the channels of adjacent bars face in opposite directions and such that all of said bars are situated in-line with respect to each other.

1 Claim, 6 Drawing Figures

LIVESTOCK GATE

BACKGROUND OF THE INVENTION

This invention relates generally to fence-type enclosures and particularly to pens for enclosing livestock.

In the past, pen enclosures for livestock have included a number of similar "gates" connected together to form a complete enclosure. Typically, each such gate has been formed either of horizontally extending and vertically spaced bars or slats connected between a pair of vertical posts, or vertically extending and horizontally spaced bars connected between upper and lower horizontally extending supports. In the case where the gates have been constructed of horizontally extending bars, such gates have been found to be undesirable for enclosing livestock such as hogs which are inclined to climb the bars.

Further, whether the gates have been constructed of vertically extending bars or horizontally extending bars, a large number of closely spaced bars are required to reduce drafts within a pen and to minimize visibility between pens. Minimizing the visibility between pens is particularly important when the pens are used to enclose hogs in view of their tendency to fight with hogs in adjacent pens. Accordingly, gates constructed in either manner are undesirably expensive because of the large number of bars required to minimize both drafts and visibility.

It is, therefore, an object of this invention to provide an improved gate for a livestock enclosure which overcomes the deficiencies of prior gates.

It is a more specific object of this invention to provide a livestock gate which requires fewer bars than prior gates and yet provides reduced visibility therethrough and minimizes drafts.

BRIEF DESCRIPTION OF THE DRAWINGS

These and other objects of the invention are more particularly set forth in the following detailed description and in the accompanying drawings of which.

DESCRIPTION OF THE PREFERRED EMBODIMENT

Broadly stated, the invention described herein is a livestock gate having a plurality of vertically extending and horizontally spaced bars supported at their upper and lower ends by upper and lower, horizontally extending support members, each bar being configured and disposed relative to adjacent bars to reduce drafts and visibility through the gate. The reduction in visibility and drafts is achieved, in a preferred embodiment, by the bars being curved or bent so as to define a three sided bar comprising a vertically extending center portion disposed between a pair of end portions which are bent away from the center portion to define a vertically extending channel between the end portions. Adjacent bars are disposed with their channels facing in opposite directions and all bars are situated substantially "in-line" along the lower and upper supports as described below.

Figure 1:
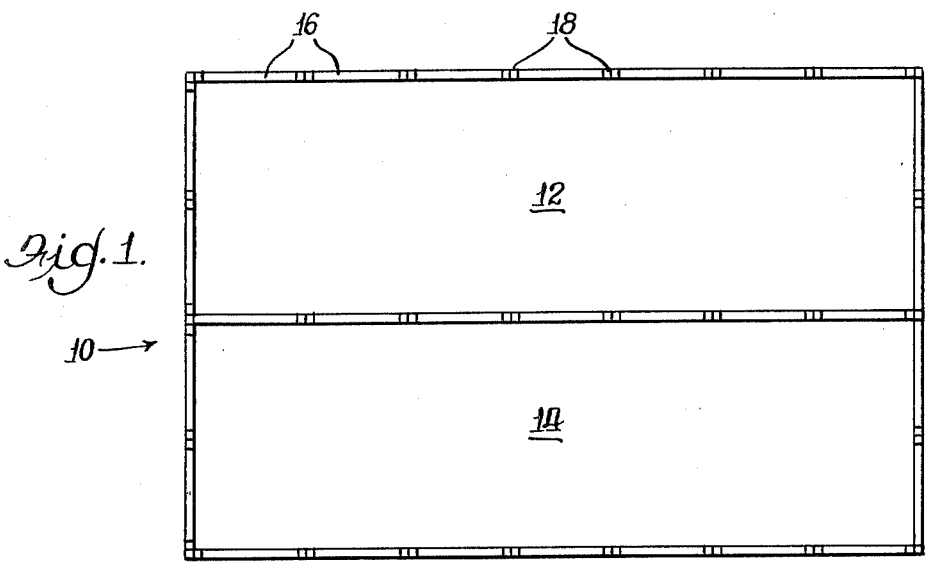
FIG. 1 is a top view of an exemplary livestock enclosure in which gates constructed according to this invention may find use.

Referring now to FIG. 1, there is shown a top view of an exemplary livestock enclosure 10 in which the novel gate may be used. The enclosure includes a pair of adjacent pens 12 and 14 for enclosing livestock, such as hogs. Each pen 12, 14 is constructed of a plurality of similar gates 16 connected at vertical posts 18 to define a complete enclosure. One or more of the gates 16 may be hinged at a post 18 to open for access to a pen.

Figure 2:
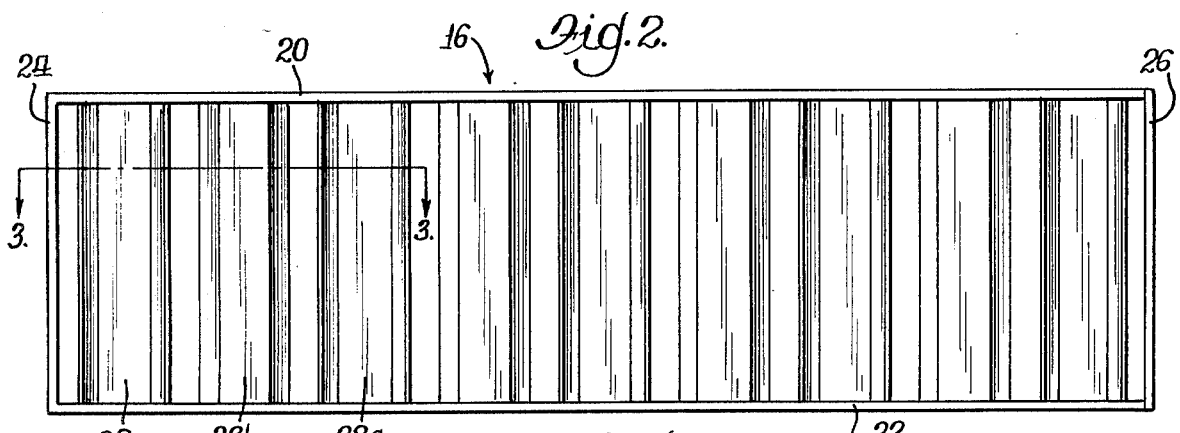
FIG. 2 is a side view of a gate in accordance with this invention.

Referring now to FIG. 2, there is shown a single gate 16 constructed in accordance with the invention. The gate 16 includes a horizontally extending, upper support member 20, a horizontally extending, lower support member 22, a pair of vertically extending members 24 and 26, and a plurality of vertically extending bars 28a, 28b, etc. All portions of the gate 16 are preferably made of steel, the members 20, 22, 24 and 26 being constructed of 1½ inch by 1½ inch tubing, for example. The vertical bars 28 are preferably constructed of 14 gauge steel but may be constructed of steel of from 11 to 18 gauge.

Figure 3:
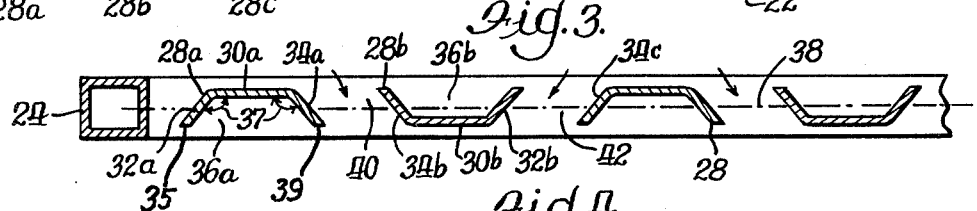
FIG. 3 is a sectional view taken along lines 3—3 of FIG. 2, illustrating the cross sectional configuration of bars used in the gate.

The configuration and location of the bars 28 is shown most clearly in FIG. 3. Bar 28a is three sided and includes a center portion 30a lying in a substantially vertical plane and a pair of vertically extending edge portions 32a and 34a. The edge portions 32a and 34a are horizontally inclined, as shown, with respect to the vertical plane of the center portion 30a so as to join the center portion 30a at substantially equal oblique (shown here as obtuse) angles 37 and to define a vertically extending channel 36a therebetween.

Bar 28b comprises three corresponding portions 30b, 32b, and 34b, with a channel 36b and is substantially indentical in cross section to the bar 28a. However, the channel 36b faces in a direction opposite that of channel 36a so that adjacent edge portions 34a and 34b are substantially parallel to each other. As a result, the visibility between bars 28a and 28b is reduced, as is the ability of a draft to form between the adjacent bars.

The next successive bar, bar 28c, is configured and disposed in a direction identical to that of bar 28a, thereby causing its edge portion 34c to be parallel to the adjacent edge portion 32b of bar 28b. The remaining bars continue as shown with substantially identical cross sections and situated such that alternate bars face in opposite directions.

To ensure that visibility and drafts are minimized through the bars 28, all bars should be closely spaced as shown and disposed "in-line," i. e., substantially aligned as shown in FIG. 3 along a line 38 parallel to the lower supporting member 22. Should alternate bars 28 be offset from the line 38 (in FIG. 3, either above or below the line 38) the visibility through the bars and propensity for drafts will be substantially increased.

Because the bars 28 are substantially identical in cross section and alternate bars face in opposite directions, their adjacent edge portions, such as portions 34a and 34b, are in substantially parallel, vertical planes which form an oblique angle to the vertical planes of their respective center portions. As a result, inclined slots are defined between adjacent bars 28, the bars 28a and 28b defining the slot 40 are bars 28b and 28c defining the slot 42. Successive slots are alternately inclined as indicated by the arrows, thereby forcing the air which passes through successive slots to flow in different directions and thus inhibiting the production of drafts. This beneficial effect tends to be reduced when the bars 28 are not disposed "in-line" as shown in FIG. 3. The reduction in drafts is further enhanced by the baffling effect of the channels 36.

In addition to reducing drafts and visibility through the gate, the illustrated construction of the bars 28 enhances the strength of the gate and reduces its costs by virtue of fewer bars 28 being required than hitherto used to achieve even less than comparable results as to reduced visibility and drafts. Accordingly, when the bars are made of steel, fewer welding operations are required and the gate can be produced at a relatively lower cost.

Although the bars 28a, 28b, etc. have been shown as being discrete and disconnected from each other, they may alternately be constructed of a continuous metal piece which is found to have a cross-section as shown in FIG. 3, whereupon the vertically extending channels 40, 42 etc. may be cut out of the continuous metal piece, with a connecting web portion remaining between adjacent bars.

A further variation on the construction of the bars 28a, 28b, etc. which tends to minimize the possibility of animals being injured on projecting edges of the bars involves rounding the outermost ends 35 and 39 of the edge portions 32a and 34a and the corresponding edge portions of the remaining bars. Such rounding (not shown) may be effected by turning the ends 35 and 39 slightly back and away from the channel 36a to present a rounded edge to the interior of the enclosure.

Figure 4:
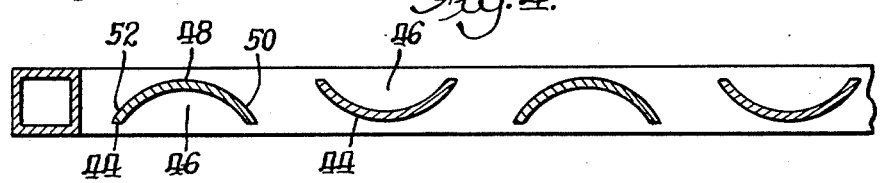
FIGS. 4, 5 and 6 illustrate cross sectional views of alternate bars for use in a gate according to this invention.

An alternate embodiment of the FIG. 3 structure is shown in FIG. 4. Each bar 44 is curved as shown to define a vertically extending concave channel 46. The channels 46 are defined by a center portion 48 disposed between vertically extending edge portions 50 and 52. The center portion 48 and edge portions 50 and 52 are not as well defined as the corresponding portions of the bars shown in FIG. 3, due to the continuous curvature of the bars 44. It is to be understood, however, that for purposes of description, each bar disclosed here does include the three portions described above even if they tend to blend together as shown in FIG. 4.

As with the FIG. 3 embodiment, alternate bars 44 are situated such that their channels 46 are facing in opposed directions and all such bars 44 are in-line with respect to each other. The curved bars 44 tend to achieve substantially the same results as bars 28 but are somewhat more expensive to form.

Figure 5:
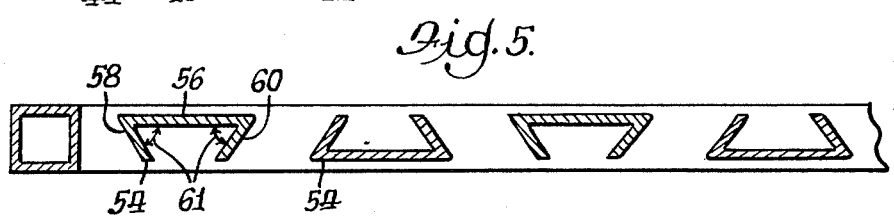

Referring now to FIG. 5, there is shown a further embodiment wherein the bars 54 include a center portion 56 extending in a substantially vertical plane and a pair of integrally formed edge portions 58 and 60 also extending vertically but inclined from the vertical plane of the center portion 56. The only difference between the bars of FIG. 5 and those of FIG. 3 is that the edge portions 58 and 60 join the center portion 56 at substantially equal acute angles 61 rather than at obtuse angles as in FIG. 3.

Figure 6:
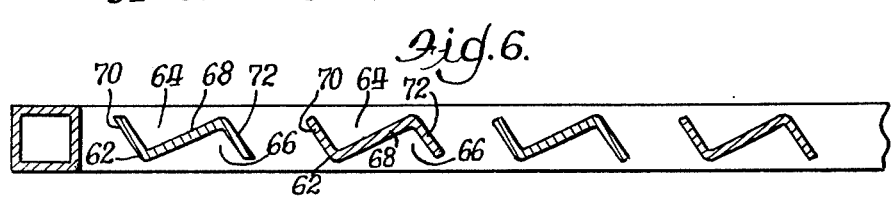

The final embodiment of the invention is shown in FIG. 6 wherein bars 62 are again three sided but define a pair of oppositely facing channels 64 and 66. The channels 64 and 66 are defined by a center portion 68 and a pair of edge portions 70 and 72, all extending in three corresponding vertical planes which are inclined with respect to each other, as shown, to define the channels 64 and 66. In this embodiment, the channels 64 of each bar 62 face in the same direction, as do the channels 66, so that adjacent edges 70, 72 of successive bars are substantially parallel to each other in order that the slot between adjacent bars be inclined as shown to restrict visibility through the gate.

The embodiments described above provide a livestock gate which has great strength but which requires relatively few vertical bars, thus rendering its manufacture less expensive than prior gates having a greater number of substantially planar bars. In addition, the described gates reduce visibility therethrough to minimize fighting among animals on opposite sides of a gate and reduces drafts through the gate to protect enclosed animals.

Although the gates herein have been described in terms of specific structure and materials, various modifications and alterations thereto will be obvious to one skilled in the art in light of this disclosure. Accordingly, it is intended that all such modifications and alterations be included within the spirit and scope of the invention as defined by the appended claims.

What is claimed is:

1. A livestock gate, comprising:
    an upper, horizontally extending support member;
    a lower, horizontally extending support member; and
    a plurality of horizontally spaced non-overlapping bars substantially identical in cross-section extending between said upper and lower support members, each such bar having a center portion substantially in a vertical plane and a pair of integral, vertically extending edge portions inclined horizontally from the vertical plane of said center portion and joining said center portion at substantially equal acute angles so as to define a vertically extending channel between said edge portions, said bars being disposed between said upper and lower support members such that alternate bars are closely spaced and face in opposing directions, the channels of adjacent bars face in opposite directions, and such that all of said bars are situated in-line with respect to each other, whereby adjacent edge portions of successive bars are in substantially parallel vertical planes which form an oblique angle to the vertical planes of the center portions so as to define between said bars a series of alternately inclined slots for limiting visibility and drafts through the gate.

* * * * *